Sept. 25, 1956  A. W. McDONALD  2,764,422
TRAILER STEP
Filed Nov. 19, 1953  2 Sheets-Sheet 1
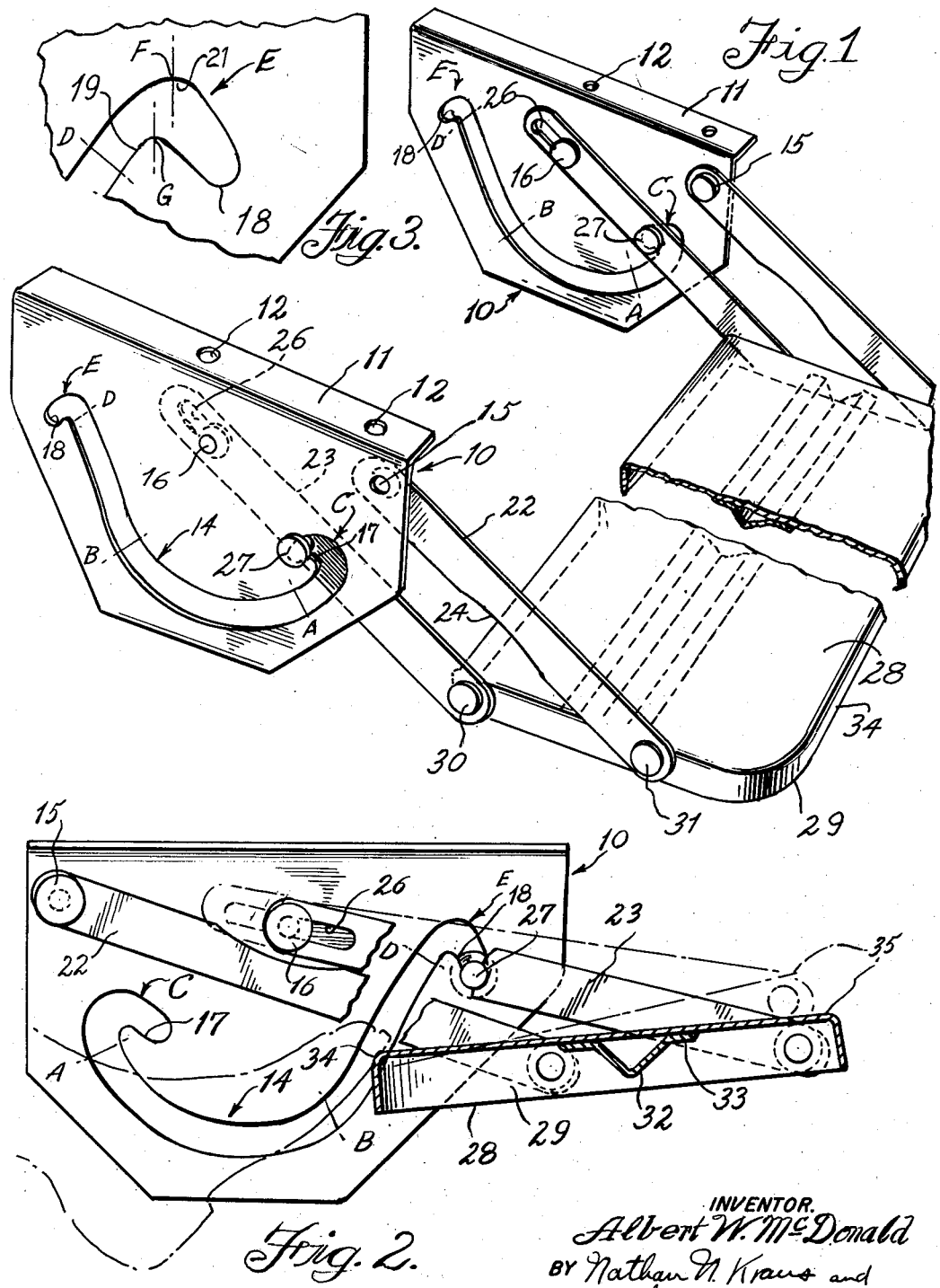
INVENTOR.
Albert W. McDonald
BY Nathan N. Kraus and
Frank H. Marks
ATTORNEYS

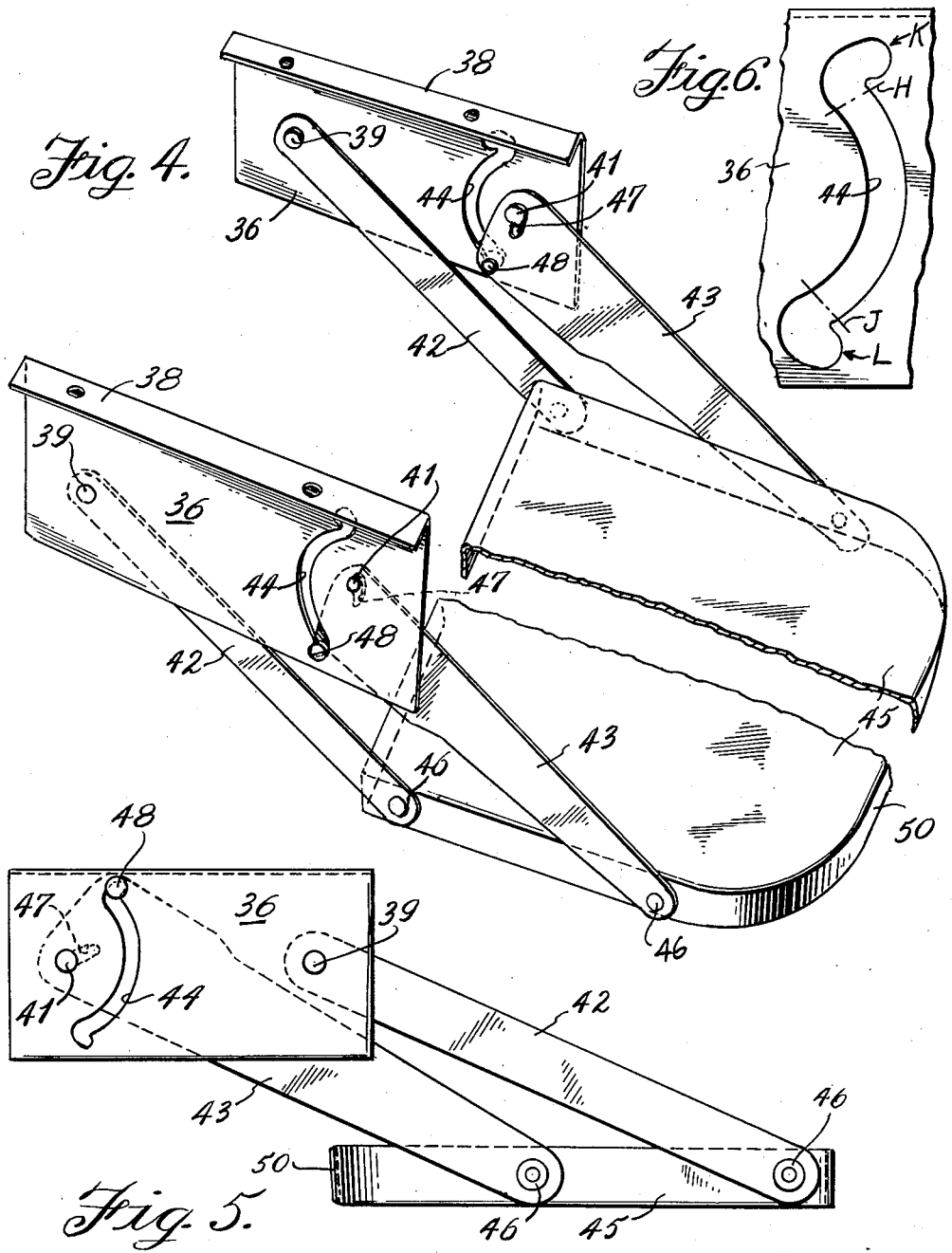

United States Patent Office 2,764,422
Patented Sept. 25, 1956

2,764,422

TRAILER STEP

Albert W. McDonald, St. Petersburg, Fla.

Application November 19, 1953, Serial No. 393,065

4 Claims. (Cl. 280—166)

My invention relates to a novel foldable step particularly adapted for use on automobile trailer vehicles but of course suitable for other applications wherever the features of such a step may be desirable.

One of the objects of my invention is the provision of a trailer step which may be quickly and easily moved to operative position and folded under the trailer in retracted position when not in use.

Another object of my invention is the provision of a trailer step which is substantially locked in operative or retracted positions against inadvertent dislodgment but which may be purposefully dislodged from either position as by an operator engaging the step with the foot in a particular manner.

Another object of my invention is the provision of a trailer step which is sturdy in construction, durable and efficient in service and economical to manufacture.

Other and further objects and advantages of my invention will become apparent from the following description when considered in connection with the accompanying drawings in which, Fig. 1 is a perspective view of a preferred embodiment of my invention showing the tread in operative position.

Fig. 2 is a transverse cross sectional view through the same showing the tread in retracted position.

Fig. 3 is a fragmentary elevational view of an enlarged scale of a detail of construction.

Fig. 4 is a perspective view of a modified embodiment of my invention showing the tread in operative position.

Fig. 5 is a side elevational view showing the tread in retracted position.

Fig. 6 is a fragmentary elevational view on an enlarged scale of a detail of construction.

Referring particularly to Figs. 1 to 3 wherein is shown a preferred embodiment of my invention, the numeral 10 indicates generally a pair of identical brackets shaped substantially as illustrated, the said brackets being formed preferably from heavy gage sheet metal and each having a flange 11 along the upper edge thereof, the said flange having perforations 12 to receive suitable fastening means such as bolts or rivets by which the brackets may be attached to a vehicle body. The brackets 10 are identical in construction, both being fabricated by the same tools thereby avoiding the necessity for providing brackets in opposed paired relationship requiring two sets of tools in the fabrication thereof.

Each of the brackets 10 is formed with a camming slot indicated generally by 14 and shaped substantially like that clearly illustrated in Fig. 2. Each slot includes a substantially arcuate portion between the points A and B, the center of which coincides substantially with the axis of stud 16 secured in the bracket. The forward end portion of the slot terminates in a substantially reverse U-shaped portion C providing a recessed shoulder as at 17 for supporting the parts hereinafter to be described. The rearward portion of the slot 14 continues upwardly at an angle in a substantially straight line between the portions B and D and terminates in an inverted U-shaped portion E providing a shoulder as at 18. Referring more particularly to Fig. 3, it will be observed that the curvatures of the upper and lower slot edges of portion E are not concentric, the center of the radius of curvature of the lower edge 19 being off-set a short distance to the left of the center of the radius of curvature of the upper edge 21 for a purpose as will be hereinafter described. In a successful embodiment of my invention I have found a distance of ⅛" between such centers highly satisfactory.

Forward and rearward pairs of tread supporting arms 22 and 23, respectively, are pivotally supported as by studs 15 and 16, respectively, from each of the brackets. The arms are preferably formed from heavy gauge sheet metal, the forward arms 22 each having a recess 24 provided along one edge thereof for purposes of clearance. The rearward arms 23 are each provided at their upper portions with an elongated slot 26 through which the stud 16 passes. Substantially intermediate the ends of each of the rearward arms 23 there is fixed thereon a stud 27 having an enlarged head, the stud passing through the camming slot 14 which guides the arms in moving from operative to retracted position and vice-versa. The enlarged heads provided on all of the studs, of course, serve to maintain the arms 22 and 23 in substantially close contiguous relation to their respective brackets.

A metal tread 28 provided with depending flanges 29 is pivotally secured to the arms by studs 30 and 31 which pass through apertures in the ends of the arms and through the depending flanges at the side of the tread. A substantially V-shaped bracing member 32 having lateral flanges 33 is welded to the underside of the tread and affords reinforcement for rigidifying the same.

While the forward and rearward arms 22 and 23 are substantially of the same length, the rearward studs 16 are disposed somewhat lower in relation to the top edge of the bracket than the forward studs 15. As a consequence when the tread 28 is in its lowermost position the tread is inclined upwardly towards the forward end thereof.

It will be apparent that the foregoing structure is a somewhat modified parallelogram arrangement and therefore the tread in any position is always right side up although not necessarily in exactly horizontal disposition.

When in operative position the parts are in the relationship illustrated in Fig. 1 with the tread 28 extended forwardly and substantially horizontal. The stud 27 is received in the slot portion C and bears on the shoulder 17 provided thereby. The weight of the tread is sufficient in and of itself to maintain the tread in the position illustrated and against inadvertent dislodgement. In order to move the tread to retracted position it is merely necessary that the operator engage the forward edge 34 of the tread 28 as with the toe of his foot to raise the said edge upwardly. This action causes the rearward arms 23 to pivot counterclockwise as viewed in Fig. 1 about the axis of the studs 16 sufficiently to cause the studs 27 to ride upwardly and over the shoulders 17 of portions C and into the arcuate portions A—B of the camming slot 14. It will be observed that because the rearward arms 23 are provided with elongated slots 26 the said arms may adjust themselves longitudinally to accomplish this function. When the studs 27 have passed over the shoulder 17 the tread will fall by gravity to a position whereby the arms 22 and 23 are substantially vertical and the studs 27 are substantially in the lowermost portion of the camming slot 14. Upon the application of a thrust as with a toe on the forward section of the tread in a rearwardly and upwardly direction the studs 27 are caused to follow the contour of the camming slots 14 riding upwardly therein until they engage with the upper edges of the inverted U-shaped slot portions E which guide the studs downwardly to the shoulder 18 at the bottom of the said slot portion. As will be observed more clearly in Fig. 3 the highest points F of the camming surfaces 21 are off-set a short distance from the highest points G of the corresponding lower edges 19 of the slots 14 so that the studs 27 are carried beyond and clear of the points G which would act as retaining shoulders. When in the relationship illustrated in Fig. 2 the tread is retained in retracted position securely against accidental dislodgement under the trailer.

When it is desired to position the tread to operative position, the operator merely applies a downward and rearward thrust on the forward edge of the tread 28 as illustrated clearly in Fig. 2 causing the rearward edge of the tread to pivot upwardly substantially to the dotted line position whereby the studs 27 are caused to ride upwardly on the lower edges 19 of the slot portions E over the high points G and into the main portions of the slots 14 so that thereafter the tread is caused to fall by gravity to a lowermost position from which it is by further engagement as by the toe of the operator caused to be moved to the position illustrated in Fig. 1.

Figs. 4 to 6 show a modified embodiment comprising a pair of identical sheet metal brackets 36 each having a lateral flange 38 suitably perforated for receiving bolts or screws by which the brackets may be attached to the underside of a trailer. A pair of studs 39 and 41 provided with enlarged heads are fixed to each of the brackets in spaced relationship, the said studs being adapted to support the arms 42 and 43 hereinafter to be described. Each of the brackets is provided with a camming slot 44 shaped substantially as illustrated in Fig. 6. The said slot includes a substantially arcuate portion between the lines H and J with the end portions being reversely directed to provide upper and lower support portions K and L, respectively.

The rearward arms 42 are formed of suitable sheet metal each being provided with a perforation at each end thereof, the upper perforations receiving the studs 39 for pivotal connection to the brackets 36 and the lower perforations receiving studs 46 pivotally connecting the arm to the rearward end of a tread 45. The forward arms 43 are similarly formed of sheet metal each being provided at the upper end with a substantially transversely extending slot 47 to receive the stud 41 and each also having fixed thereto at a point spaced from the slot a stud 48 passing through the slot 44. The lower end of each arm 43 is perforated to receive a stud 46 pivotally connecting the arm to the forward end of the tread 45.

The tread 45 is constructed similarly to the tread 34 previously described.

It will be apparent that the modified embodiment hereinabove described is substantially a parallelogram arrangement and accordingly the tread whether disposed in operative or inoperative position is always maintained in horizontal disposition.

In Fig. 4 is illustrated the relationship of the parts when the tread 45 is in operative position. It will be seen that the studs 48 are received in the lower support portions L of the camming slots 44 and that the tread accordingly is locked in position against inadvertent displacement through the effect of gravity and the weight of the tread itself. In order to move the tread from operative to inoperative position, the operator merely engages the forward edge 50 of the tread as with the toe of his foot to elevate the tread to cause the studs 48 to enter into the arcuate portions H—J of the slots. It will be observed that in this operation the studs 48 follow the arcuate contours of the said slot portions and when the slot portions K are reached the operator applies a rearward thrust against the tread causing the studs 48 to follow the slots upwardly and finally to engage in the upper support portions K wherein the studs are substantially locked in and retained against inadvertent dislodgement. The slots 47 permit limited transverse movement of the arms 43 so that they may adjust themselves to accommodate the change of direction of the slots 44.

In order to return the tread to operative position the operator merely engages the underside of the forward edge of the tread 45 urging the same upwardly as with his toe. This action effects a dislodgement of the studs 48 from within the upper support portions K of the slots 44 causing the studs to enter into the arcuate portions H—J. Accordingly the tread falls by gravity to a position where the arms 42 and 43 are substantially vertical. The operator further engages the forward end of the tread and draws the same forwardly causing the studs 48 to follow the contour of the slots and finally to be received within the lower support portions L of the slots wherein they are securely retained.

Various changes coming within the spirit of my invention may suggest themselves to those skilled in the art. Hence I do not wish to be limited to the specific embodiments described or uses mentioned, but intend the same to be merely exemplary, the scope of my invention being limited only by the appended claims.

I claim:

1. A foldable step for vehicles and the like comprising a pair of spaced brackets adapted to be secured to the underside of the body of a vehicle, forward and rearward pairs of arms pivotally connected at their upper ends to fixed spaced points on said brackets and depending therefrom, a step comprising a tread pivotally secured to the lower ends of said arms, each of said brackets having a camming slot therein to determine the movement of said tread, a stud carried on each of one of said pairs of arms intermediate the ends thereof, said studs cooperating with respective slots to guide said tread into operative or inoperative position.

2. A foldable step for vehicles and the like comprising a pair of spaced brackets adapted to be secured to the underside of the body of a vehicle, forward and rearward pairs of arms pivotally connected at their upper ends to fixed spaced points on said brackets and depending therefrom, a step comprising a tread pivotally secured to the lower ends of said arms, camming means associated with each of said brackets for determining the movement of said tread, said camming means being below said spaced points, and means carried on each of one of said pairs of arms intermediate the ends thereof and cooperating with respective camming means to guide said tread into operative or inoperative position.

3. A foldable step for vehicles and the like comprising pair of spaced brackets adapted to be secured to the underside of the body of a vehicle, forward and rearward pairs of arms pivotally connected at their upper ends to fixed spaced points on said brackets and depending therefrom, a step comprising a tread pivotally secured to the lower ends of said arms, each of said brackets having a camming slot therein below said fixed spaced points to determine the movement of said tread, and a stud carried on each of said rearward arms intermediate the ends thereof and cooperating with a respective slot to guide said tread into operative or inoperative position, each of said rearward arms having a slot at the upper pivotal connection with a respective bracket whereby said rearward arms in pivoting are capable of limited longitudinal shifting to accommodate to changes in direction of said camming slots.

4. A foldable step for vehicles and the like comprising a pair of spaced brackets adapted to be secured to the underside of the body of a vehicle, forward and rearward pairs of arms pivotally connected at their upper ends to fixed spaced points on said brackets and depending therefrom, a step comprising a tread pivotally secured to the lower ends of said arms, each of said brackets having a generally arcuate camming slot therein below said fixed spaced points, a stud carried on each of said rearward arms and spaced from the upper ends thereof and cooperating with a respective slot to guide said tread into operative or inoperative position, the terminal portions of each of said camming slots being reversely directed from the general direction of the slot and being arranged to retain a respective stud against accidental dislodgment and to support said tread in operative or inoperative position.

References Cited in the file of this patent

UNITED STATES PATENTS

| | | |
|---|---|---|
| 606,932 | Maxon | July 5, 1898 |
| 1,118,584 | Roebuck | Nov. 24, 1914 |
| 1,363,396 | Cross | Dec. 28, 1920 |